(12) United States Patent  
Lee (10) Patent No.: US 8,171,267 B2  
(45) Date of Patent: May 1, 2012

(54) METHOD AND APPARATUS FOR MIGRATING TASK IN MULTI-PROCESSOR SYSTEM

(75) Inventor: Seung-won Lee, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 799 days.

(21) Appl. No.: 12/216,149

(22) Filed: Jun. 30, 2008

(65) Prior Publication Data

US 2009/0187912 A1    Jul. 23, 2009

(30) Foreign Application Priority Data

Jan. 22, 2008  (KR) .................. 10-2008-0006704

(51) Int. Cl.
- *G06F 7/38* (2006.01)
- *G06F 9/00* (2006.01)
- *G06F 9/44* (2006.01)
- *G06F 15/00* (2006.01)

(52) U.S. Cl. ............................ 712/225; 712/32; 712/43

(58) Field of Classification Search .................. None
See application file for complete search history.

(56) References Cited

U.S. PATENT DOCUMENTS

| 6,769,121 B1 * | 7/2004 | Koyama et al. ............... 718/100 |
| 2006/0037017 A1 * | 2/2006 | Accapadi et al. ............. 718/100 |
| 2006/0212868 A1 | 9/2006 | Takayama et al. |
| 2006/0229861 A1 | 10/2006 | Tatsuoka et al. |
| 2007/0294578 A1 * | 12/2007 | Qiao et al. ....................... 714/17 |

FOREIGN PATENT DOCUMENTS

| KR | 2001-0084893 | 9/2001 |
| KR | 10-2003-0054680 | 7/2003 |
| KR | 10-2007-0049226 | 5/2007 |

OTHER PUBLICATIONS

Weissman et al.; Efficient Fine-Grain Thread Migration with Active Threads; 1999.*  
Chakraborty et al.; Computation Spreading: Employing Hardware Migration to Specialize CMP Cores On-the-fly; 2006; ACM.*  
The Intel Pentium M Processor: Microarchitecture and Performance, by Gochman et al., *Intel Technology Journal*, vol. 7, Issue 2, May 2003 (18 pages).

(Continued)

*Primary Examiner* — Corey S Faherty  
(74) *Attorney, Agent, or Firm* — Staas & Halsey LLP (57) ABSTRACT

A method and apparatus for migrating a task in a multi-processor system. The method includes examining whether a second process has been allocated to a second processor, the second process having a same instruction to execute as a first process and having different data to process in response to the instruction from the first process, the instruction being to execute the task; selecting a method of migrating the first process or a method of migrating a thread included in the first process based on the examining and migrating the task from a first processor to the second processor using the selected method. Therefore, cost and power required for task migration can be minimized. Consequently, power consumption can be maintained in a low-power environment, such as an embedded system, which, in turn, optimizes the performance of the multi-processor system and prevents physical damage to the circuit of the multi-processor system.

15 Claims, 8 Drawing Sheets

OTHER PUBLICATIONS

Thermal Management System for High Performance PowerPC Microprocessors, by Sanchez et al., in *Proceedings of COMPCON 97*, pp. 325-330, 1997.

Single-ISA Heterogeneous Multi-Core Architectures: The Potential for Processor Power Reduction, by Kumar et al., in *Proceedings of the 36th International Symposium on Microarchitecture*, pp. 81-92, Dec. 2003.

A Thermal-Aware Superscalar Microprocessor, by Lim et al., in *Proceedings of the 2002 International Symposium on Quality Electronic Design*, pp. 517-522, 2002 (seven pages).

* cited by examiner

```
#include "tmigration.h"
#include "des.h"

main() {
XXX plain_buffer, cipher_buffer, key;
/* restore variables and status */
        mg_id = restore(context);
        if(mg_id == 0) goto resume;
/* end restore */
        while(1) {
                if(wait_new_plain() == BREAK) break;
                migration_point(mg_id, context);
resume:      read_data(plain_buffer, key);
                cipher_buffer = do_des(plain_buffer, key);
                write_data(cipher_buffer);
        }
}
```

FIG. 6B

METHOD AND APPARATUS FOR MIGRATING TASK IN MULTI-PROCESSOR SYSTEM

CROSS-REFERENCE TO RELATED APPLICATIONS

This application claims the priority of Korean Patent Application No. 10-2008-0006704, filed on Jan. 22, 2008, in the Korean Intellectual Property Office, the disclosure of which is incorporated herein in its entirety by reference.

BACKGROUND

1. Field

One or more embodiments of the present invention relate to a method, medium, and apparatus for migrating a task, which is currently allocated to a processor from among a plurality of processors included in a multi-processor system, from the processor to another processor in order for load balancing and even power consumption in an operating system.

2. Description of the Related Art

Technological development has reduced the size of electrical circuits and clock cycle time. As improvement of electrical circuit performance slows down due to increased power consumption of chips, current processor architecture is developing in a direction where the storage capacity of a chip is increased to allow for the mounting of a plurality of processors on the chip. Since parallelism, a processing design in which a plurality of tasks are processed simultaneously, can be implemented in this multi-processor environment, significant performance enhancement can be expected as compared to that of a single-processor environment. However, it has been discovered that system performance fails to increase in proportion to an increase in the number of processors due to load imbalance. That is, tasks are not equally distributed to all processors and executed by the processors. Instead, more tasks are allocated to a specified processor. In order to solve this problem, load balancing technology, which migrates tasks from processors with more loads to other processors with less loads, is being explored as a solution.

Meanwhile, a conventional embedded system, which is additionally included in a product or a solution to execute a certain task, generally requires less computation than a universal system. However, technological advancement has increased the amount of data to be processed, thereby requiring better processing capabilities. Accordingly, the conventional embedded system is developing into a multi-processor-based embedded system having two or more processors.

The multi-processor-based embedded system can be applied in various fields such as portable terminals, automotive control, home appliances, medical automation, and sensor networks. Due to the requirements and limitations of an environment in which the multi-processor-based embedded system operates, the stable and high performance of the multi-processor-based embedded system must be guaranteed in a low-power environment. In particular, the multi-processor-based embedded system may be required to perform task migration due to the limited power that can be supplied to its processors, unlike load imbalance which occurs in a conventional operating system. For example, when there is a lack of power supplied to processors, a clock frequency is limited. Thus, the performance of task execution may deteriorate. On the contrary, when power is supplied mainly to a specified processor, a hot spot may be generated due to generation of heat. Consequently, a timing error may occur, or a circuit may be physically damaged. Therefore, in the multi-processor-based embedded system, it is required to appropriately distribute tasks among processors which are to execute the tasks and, when necessary, migrate some of the tasks between the processors, in order to maintain the power consumption of the processors at an equal level.

SUMMARY

One or more embodiments of the present invention provide a method, medium, and apparatus for migrating a task, the method and apparatus being capable of addressing inefficiency which occurs when a task is migrated from one processor to another processor because a multi-processor system has load imbalance or because a specified processor dominates the power consumption of the multi-processor system and preventing uneven power consumption of processors in a low-power environment of an embedded system.

Additional aspects and/or advantages will be set forth in part in the description which follows and, in part, will be apparent from the description, or may be learned by practice of the invention.

According to an aspect of embodiments of the present invention, there is provided a method of migrating a task, which is to be processed by a first processor from among a plurality of processors included in a multi-processor system, from the first processor to a second processor. The method includes examining whether a second process has been allocated to the second process, the second process having a same instruction to execute as a first process and having different data to process in response to the instruction from the first process, the instruction being to execute the task, selecting a method of migrating the first process or a method of migrating a thread included in the first process based on the examination result, and migrating the task from the first processor to the second processor using the selected method.

According to another aspect of embodiments of the present invention, there is provided a computer-readable recording medium on which a program for executing the above method in a computer is recorded.

According to another aspect of embodiments of the present invention, there is provided an apparatus for migrating a task, which is to be processed by a first processor from among a plurality of processors included in a multi-processor system, from the first processor to a second processor. The apparatus includes an examining unit examining whether a second process has been allocated to the second processor, the second process having a same instruction to execute as a first process and having different data to process in response to the instruction from the first process, the instruction being to execute the task, a migration method selecting unit selecting a method of migrating the first process or a method of migrating a thread included in the first process based on the examination result, and a task migrating unit migrating the task from the first processor to the second processor using the selected method.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Reference will now be made in detail to the embodiments, examples of which are illustrated in the accompanying drawings, wherein like reference numerals refer to the like elements throughout. The embodiments are described below to explain the present invention by referring to the figures.

Embodiments of the present invention will now be described more fully with reference to the accompanying drawings, in which exemplary embodiments of the invention are shown. As used herein, the term 'ARM' denotes a processor (a central processing unit (CPU) or a core) widely used in an embedded system. The ARM is a type of processor which can be used in an environment where embodiments of the present invention are implemented. It will be understood by those of ordinary skill in the art to which embodiments of the present invention pertain that various processors other than the ARM can be used.

Figure 1:
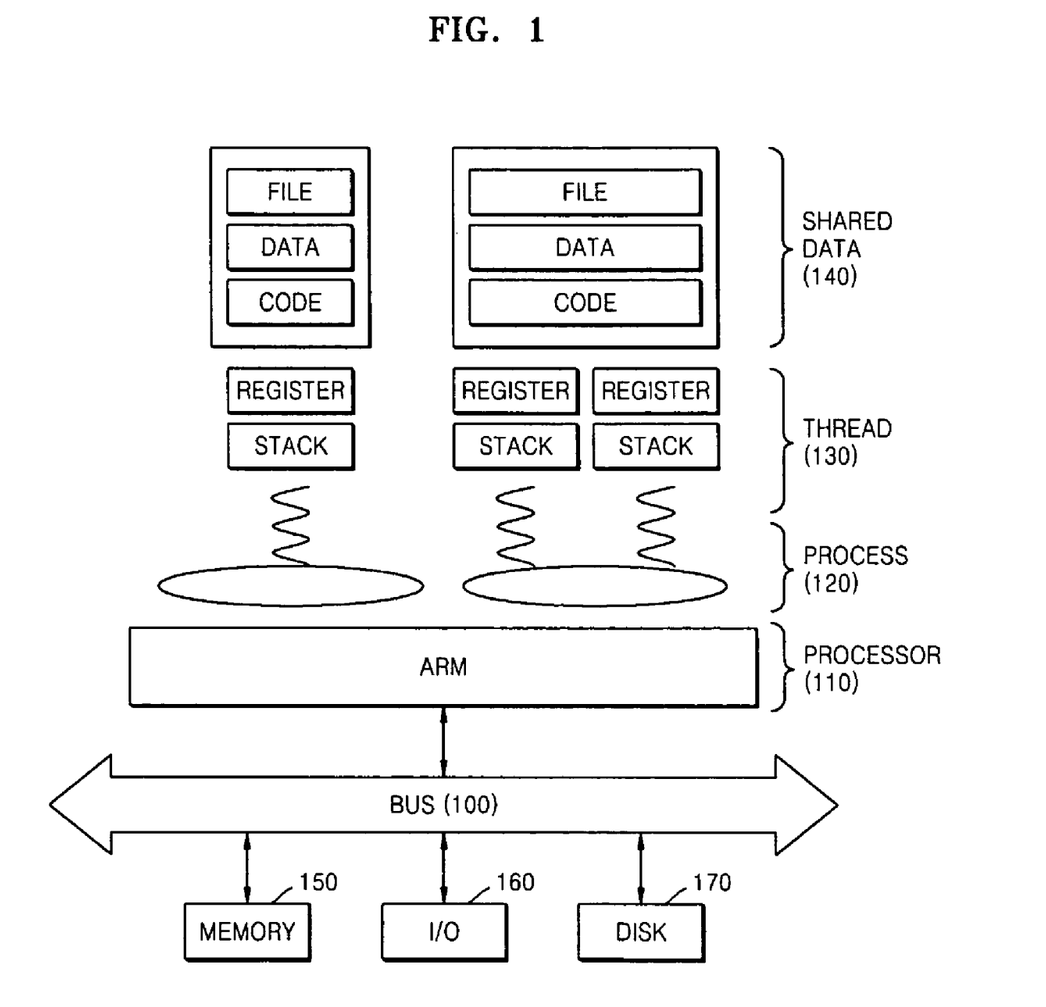
FIG. 1 illustrates an environment in which an embodiment of the present invention is implemented.

FIG. 1 illustrates an environment in which an embodiment of the present invention is implemented. Referring to FIG. 1, a system according to the present embodiment includes ARM, that is, a processor 110 which processes a task, a memory 150 which is a main memory unit, an input/output (I/O) unit 160 which receives input from a user and displays results, a disk 170, which is an auxiliary memory unit, and a bus 100 which is an electrical passage commonly used by the processor 110, the memory 150, the I/O unit 160 and the disk 170 in a circuit of a computer to exchange information between them.

In FIG. 1, processes 120, threads 130, and shared data 140 are illustrated with respect to the ARM, that is, the processor 110. The processes 120, the threads 130, and the shared data 140 are logical concepts which are implemented on the computer system separately from the physical devices described above. Although these concepts are familiar to those of ordinary skill in the art, herein is provided a detailed description in order to promote the understanding of the differences between task migration methods according to embodiments of the present invention. Thus, the logical concepts and the differences between them will now be described.

Each of the processes 120 is an object which is generally allocated to the processor 110 and executed by the processor 110. Each of the processes 120 is a program that is being executed. To occupy the processor 110, each of the processes 120 requires physical resources such as a processor allocation time, the memory 150, files, and the I/O unit 160. When each of the processes 120 is generated or executed, these physical resources are allocated to the process 120. In addition, each of the processes 120 includes a program code, a program counter, which indicates where in the program the process 120 currently is, and the content of a register of the processor 110. A database, which is a program shared by the processes 120, and a document editor are referred to as re-entrant programs, and each of the processes 120 has one or more stacks, which temporarily store data for these re-entrant programs, and data portions which store shared data.

Properties of the processes 120 described above may be summarized in two perspectives—resources for program execution and a control flow to be executed (a target object to be dispatched). Specifically, from the perspective of resources, an operating system must have information such as a process control block (PCB) to store and represent the processes 120. Thus, it requires a high cost to generate and manage the processes 120. From the perspective of the control flow, each of the processes 120 may include a plurality of execution units. That is, a plurality of execution units, each having one execution pointer, may be included in each of the processes 120. In this case, the execution units are referred to as the threads 130 or light weight processes (LWPs). Each execution is referred to as the process 120 or a task.

Like the processes 120, each of the threads 130 is a basic unit using the processor 110 and an object in a process that executes a program instruction, that is, a control flow that can independently execute an instruction. Each of the threads 130 shares a code, an address space, a file which is a resource of an operating system, and a signal with other threads included in the same group. This group of threads 130 corresponds to each of the processes 120. That is, each of the processes 120 is also referred to as a heavy weight process and includes one or more threads 130.

A conventional Microsoft disk operating system (MS-DOS) is based on a single-thread support system in which a single process can execute a single thread. However, various embodiments of the present invention are based on a multi-thread support system in which a single process can execute a plurality of threads. In the multi-thread support system, a single process includes one or more threads, and the threads share the resources and state information of the process. In addition, the threads access the same data while existing in the same address space. Those of ordinary skill in the art to which embodiments of the present invention pertain may understand that examples of the multi-thread support system include Windows NT and Solaris as universal operating systems and Windows CE as an embedded operating system.

Assuming the system which is disclosed in FIG. 1 as the multi-thread support system, the processes 120, which are processing units of the processor 110 are indicated by ovals. In addition, the threads 130 are indicated by zigzag lines extending from the ovals, i.e., the processes 120. Each of the processes 120 includes one or more threads 130. Each of the threads 130 has a stack and a register and is a unit that independently executes an instruction. In addition, each of the processes 120 has the shared data 140 including a code, data and a file. A group of threads included in a specified process shares the shared data 140. In FIG. 1, each of the processes 120 corresponds to one shared data 140, and the threads 130 included in each of the processes 120 share the shared data 140.

In the environment of an embodiment in which processes and threads coexist as illustrated in FIG. 1, the generation and termination of a thread may be faster and generate less loads than those of a process. In addition, task exchanges between threads within the same process can be performed quickly. That is, since threads in the same process share resources of the process while having their own stack and register, the generation of the threads and the task exchanges between the threads can be performed with higher efficiency and economic feasibility than the generation of processes and the task exchanges between the processes.

Based on the properties of and the differences between a process and a thread described above, a method of migrating a task using a multi-processor system according to embodiments of the present invention will now be described. As described above, the multi-processor system may have a load imbalance. In addition, a specified processor may dominate the total power consumption of the multi-processor system. In this case, the multi-processor system needs to migrate a task from a processor to another processor. Such task migration may largely be classified into process migration and thread migration according to the target of migration. Process migration denotes migrating a process itself that executes a task when an operating system requests the migration of the task, and thread migration denotes migrating a thread included in the process, which will be described in more detail with reference to FIGS. 2A through 2D.

Figure 2A:
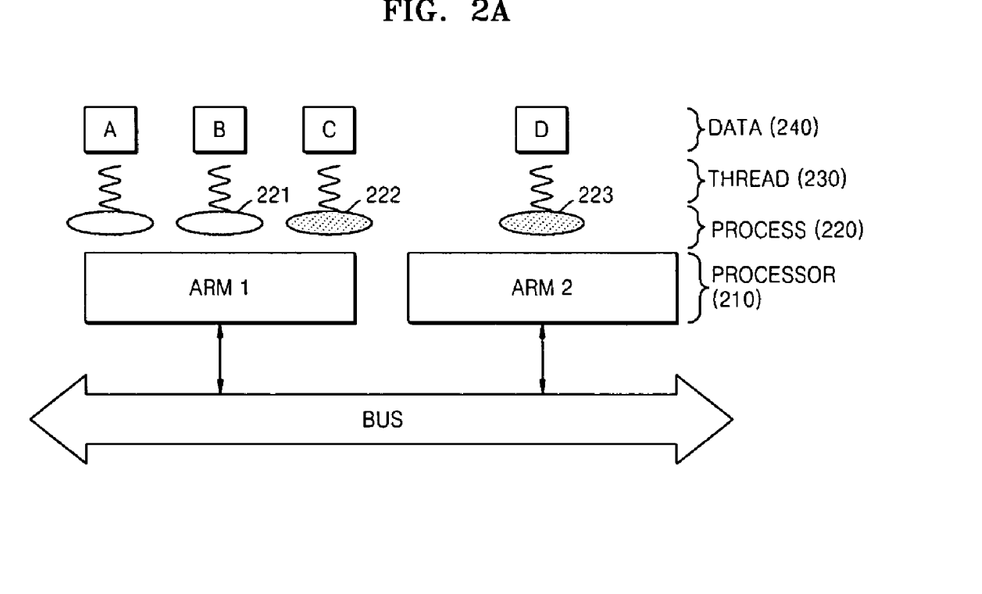
FIGS. 2A through 2D illustrate a method of migrating a task in a multi-processor system.

FIG. 2A illustrates a situation before an operating system of a multi-processor system, more specifically, a scheduler of the operating system, makes a task migration request. The bus and ARM 1 and ARM 2 of FIG. 2A are extracted from the physical environment of FIG. 1 (represented in FIG. 1 as bus 100 and ARM) and illustrated in FIG. 2A. Referring to FIG. 2A, processors 210, processes 220, and threads 230 are identical to the logical concepts described above. In addition, data 240 are objects that are to be processed by the processors 210 and corresponds to each of the threads 230 allocated to the processors 210. Processes 222 and 223 (shaded in FIG. 2A) are processes that are to execute the same code but process different data, that is, data C and D. Hereinafter, processes, which execute the same instruction code but process different objects, will be referred to as clone processes, and will be shown as shaded ovals. The clone processes are generally generated in order to embody data level parallelism.

Referring to FIG. 2A, three tasks (three processes and three threads) are allocated to ARM1, and one task (one process and one thread) is allocated to ARM2. If the tasks allocated to ARM1 generate more loads than the task allocated to ARM2, the operating system may migrate some of the tasks of ARM1 to ARM2. In addition, if the tasks allocated to ARM1 consume significantly more power than the task allocated to ARM2 in a low-power environment, the operating system may also migrate some of the tasks of ARM1 to ARM2. A process migration method and a thread migration method, which can be used in this situation, will now be described with reference to FIGS. 2B and 2C, respectively.

Figure 2B:
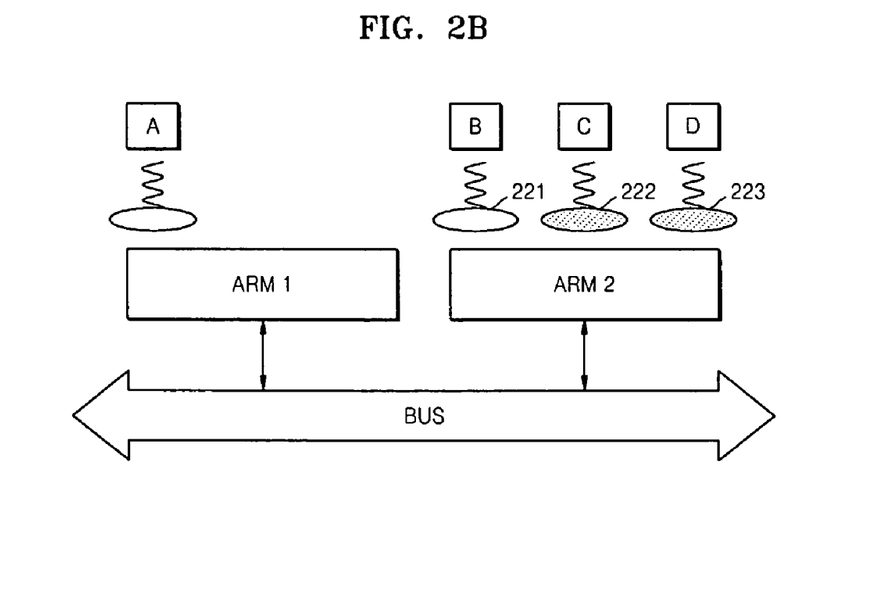

FIG. 2B illustrates the process migration method used to migrate a task. The situation illustrated in FIG. 2B is after the processes 221 and 222 in the situation of FIG. 2A have been moved from ARM1 to ARM2. It can be seen from FIG. 2A that threads and related data B through D included in each of the processes 221 and 222 have all been moved to ARM2. Here, it should be noted that the processes 222 and 223 allocated to ARM2 are clone processes. As described above, clone processes are processes that are to execute the same instruction but process different data. When the clone processes are allocated to different processors (ARM1 and ARM2 in FIG. 2B) and execute tasks, there is no problem. However, when the clone processes are allocated to the same processor (ARM2 in FIG. 2B) and execute tasks, resources are unnecessarily wasted. This is because the processes 222 and 223, which are clone processes, execute the same instruction, that is, the same code, although they process different data. Consequently, a single processor (ARM2) unnecessarily processes two overlapping codes. In addition, since a code is migrated from ARM1 to ARM 2 although the same code for the process 223 is allocated to ARM 2, memory is wasted, and the migration of the code causes an overhead. In order to address the above problems related to the process migration method, the thread migration method is suggested in FIG. 2C.

Figure 2C:
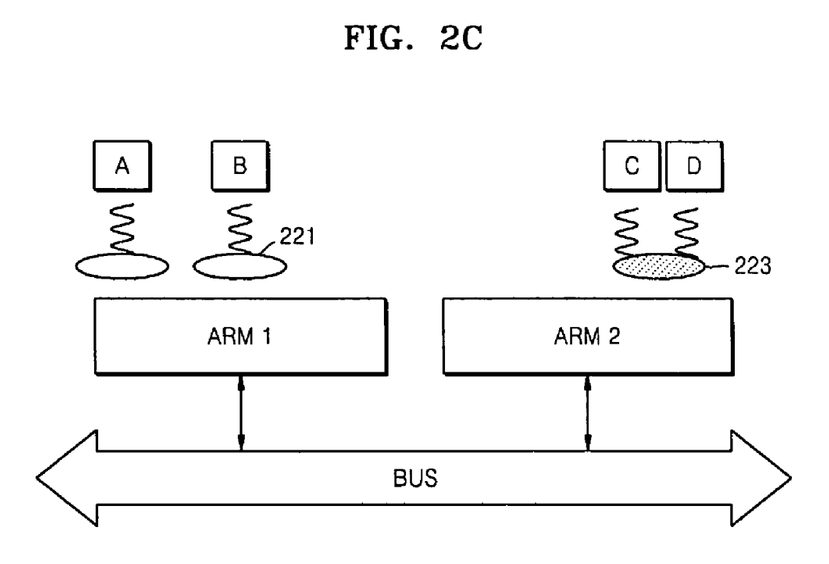

FIG. 2C illustrates the thread migration method used to migrate a task. The situation illustrated in FIG. 2C is after a thread included the process 222 in the situation of FIG. 2A has been moved from ARM1 to ARM2. Since the process 222 allocated to ARM1 and the process 223 allocated to ARM2 are clone processes, that is, since the same code for executing an instruction is allocated to each of ARM1 and ARM2, the process 222 as a whole is not moved. Instead, a thread included in the process 222 and data C corresponding to the thread are moved from ARM1 to ARM2. Thus, the thread and the data C are allocated to the process 223 to execute a task. The thread migration method requires less cost and a smaller number of processes, which are allocated to a processor, than the process migration method of FIG. 2B, thereby reducing the overhead of the entire system.

However, even if a thread included in the process 221, for example as shown in FIG. 2B, is to be additionally moved from ARM1 to ARM2 as in the situation of FIG. 2C, the thread cannot be moved since a clone process of the process 221 does not exist in ARM2. This problem stems from structural rigidity which allows only one of the process migration method of FIG. 2B and the thread migration method of FIG. 2C to be used when a task migration request is made. Therefore, in the following embodiments of the present invention, a method of migrating a task using the process migration method or the thread migration method according to whether clone processes exist when a task migration request is made, is described below.

Figure 2D:
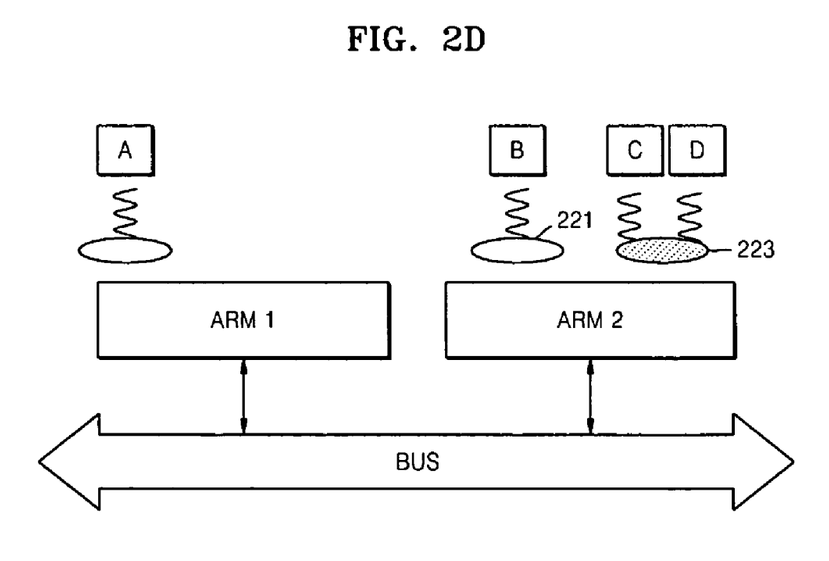

FIG. 2D illustrates a method of migrating the process 221 in the situation of FIG. 2C from ARM1 to ARM2. It is assumed that the thread migration method was used in a previous task migration operation. According to an embodiment of the present invention, even if the thread migration method was used in the previous task migration operation, the process migration method or the thread migration method is used in a current task migration operation after it is checked whether a clone process exists. Referring to FIG. 2D, since no clone process corresponding to the process 221 exists, the process 221 has been moved from ARM1 to ARM 2 by using the process migration method. Basic concepts employed by embodiments of the present invention have been described above. Detailed configurations for implementing the embodiments of the present invention will hereinafter be described.

Figure 3:
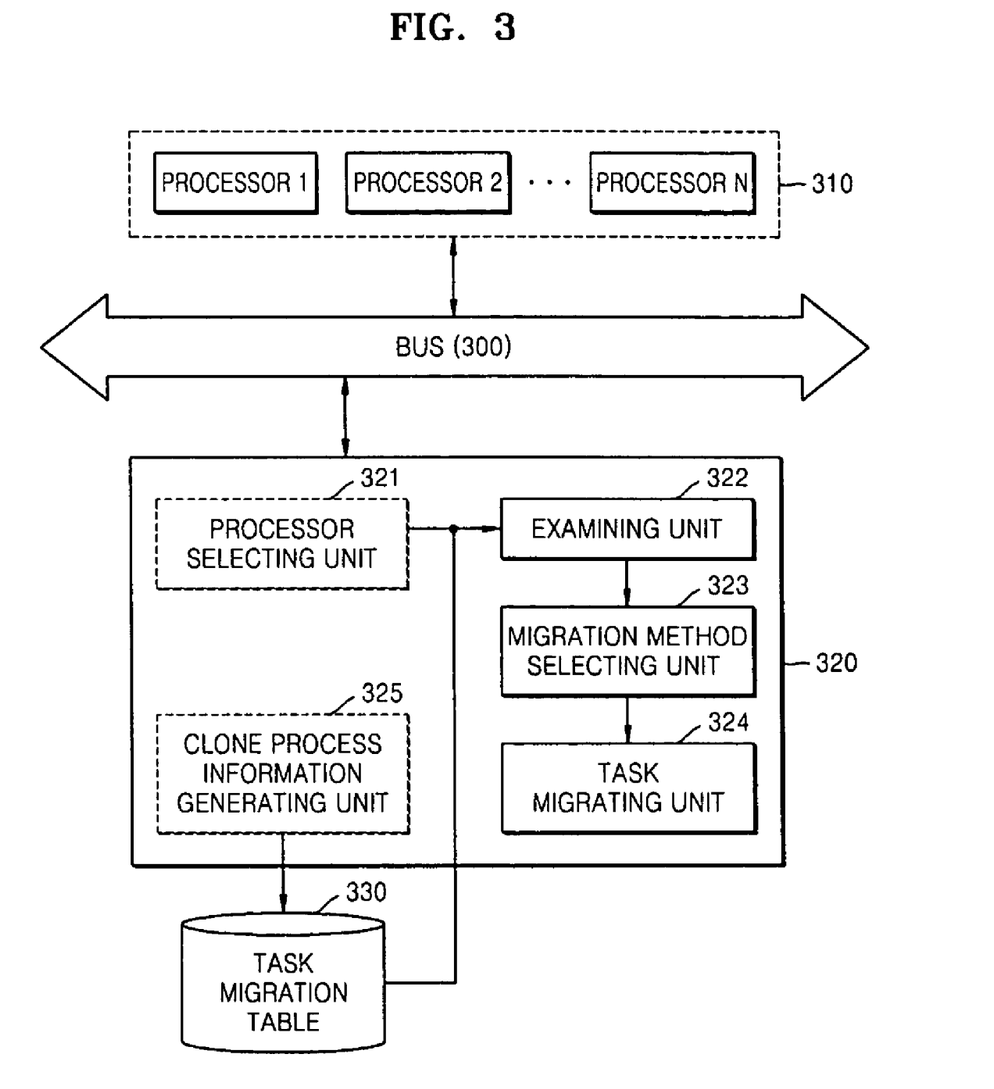
FIG. 3 illustrates an apparatus for migrating a task in a multi-processor system according to an embodiment of the present invention.

FIG. 3 illustrates an apparatus for migrating a task in a multi-processor system according to an embodiment of the present invention. Referring to FIG. 3, the apparatus includes a bus 300, a multiprocessor 310, a scheduler 320, and a task migration table 330. A memory, an I/O unit and a disk may also be included in the apparatus as shown in FIG. 1 but are omitted for the simplicity of description. The multiprocessor 310 may include two or more processors. The scheduler 320 appropriately allocates a plurality of tasks or processes to a plurality of processors in an operating system. In an embodiment, the scheduler 320 selects the process migration method or the thread migration method in order to migrate a task. The scheduler 320 includes a processor selecting unit 321, an examining unit 322, a migration method selecting unit 323, a task migrating unit 324, and a clone process information generating unit 325.

Specifically, the processor selecting unit 321 selects a source processor, from which a task is to be migrated, and a target processor, to which the task is to be migrated, from among a plurality of processors included in the multiprocessor 310 based on the load or power consumption of each of the processors. In this case, the source processor may be a processor that generates more loads and consumes more power, and the target processor may be a processor that generates less loads and consumes less power.

The examining unit 322 examines whether a clone process, which is to execute the same instruction as a specified process allocated to the source processor but process different data from the specified process, has been allocated to the target processor. To this end, the clone process information generating unit 325 will first be described.

The clone process information generating unit 325 generates clone process information indicating whether a process to be migrated has the same instruction to execute as one of the other processes previously generated and has different data to process from the previously generated process. The clone process information generating unit 325 may generate the clone process information by extracting information regarding the allocation of each process to a processor from parallelization information which is generated at compile time. The parallelization information indicates how the scheduler 320 distributes processes, which are to execute tasks, among processors. Since the allocation rule may be determined by a predetermined algorithm when a scheduling program is generated, the parallelization information on how clone processes are generated can be extracted.

Alternatively, the clone process information generating unit 325 may track generation information of processes in real time to generate the clone process information. For example, if a function or action, which is called to generate a process (for example, a fork ( ) function which is called when a process is executed on a UNIX-based system), is tracked, clone process information having the same instruction code can be extracted in real time when a process is generated. The generated clone process information may be provided to the examining unit 322 and used to determine whether a clone process corresponding to the current process exists. When necessary, the generated clone process information may be stored in the separate task migration table 330.

The task migration table 330 may be a logical data structure or physical storage device which stores clone process information corresponding to each process, which is to be migrated, and thread information included in the process. That is, the task migration table 330 may be implemented as a memory, disk, or hardware which stores clone process information generated by the clone process information generating unit 325. The data structure of the task migration table 330 and a specific method of using the task migration table 330 will be described later in more detail.

The examining unit 322 searches for a clone process, which is to execute the same instruction as a process to be migrated and execute different data from the process to be migrated, based on clone process information generated by the clone process information generating unit 325 and determines whether the found clone process has been allocated to the target processor. The examining unit 322 determines whether the found clone process has been allocated to the target processor because a thread included in the clone process, albeit found, cannot be migrated to the target processor if the found clone process has not been allocated to the target processor.

Next, the migration method selecting unit 323 selects the process migration method or the thread migration method based on the examination result of the examining unit 322. The migration method selecting unit 323 may be physically implemented as software on a memory or may be implemented as hardware, such as a logic circuit, for fast performance. If the clone process has been allocated to the target processor, the migration method selecting unit 323 may select the thread migration method in which only a thread included in a specified process is migrated. If the clone process has not been allocated to the target processor, the migration method selecting unit 323 may select the process migration method in which a specified process itself is migrated.

Finally, the task migrating unit 324 migrates a task from the source processor to the target processor using a migration method selected by the migration method selecting unit 323. Specifically, if the migration method selecting unit 323 selects the process migration method, the task migrating unit 324 migrates a target process from the source processor (actually, a task queue allocated to the source processor) to the target processor (actually, a task queue allocated to the target processor). If the migration method selecting unit 323 selects the thread migration method, the task migrating unit 324 migrates a thread, which processes corresponding data, from a corresponding process to a clone process. In this case, after the thread is migrated, if there is no thread left in the corresponding process, the corresponding process is terminated by the scheduler 320 since it has no more tasks to execute.

The apparatus for migrating a task in the multi-processor system has been described above. According to an embodiment, when a task migration request is made because the multi-processor system has a load imbalance or because a specified processor dominates the total power consumption of the multi-processor system, the apparatus selects, in real time, the process migration method or the thread migration method according to whether a clone process exists. Therefore, the cost and power required for task migration can be minimized. Consequently, even power consumption can be maintained in a low-power environment, such as an embedded system, which, in turn, optimizes the performance of the multi-processor system and prevents physical damage to the circuit of the multi-processor system.

Figure 4:
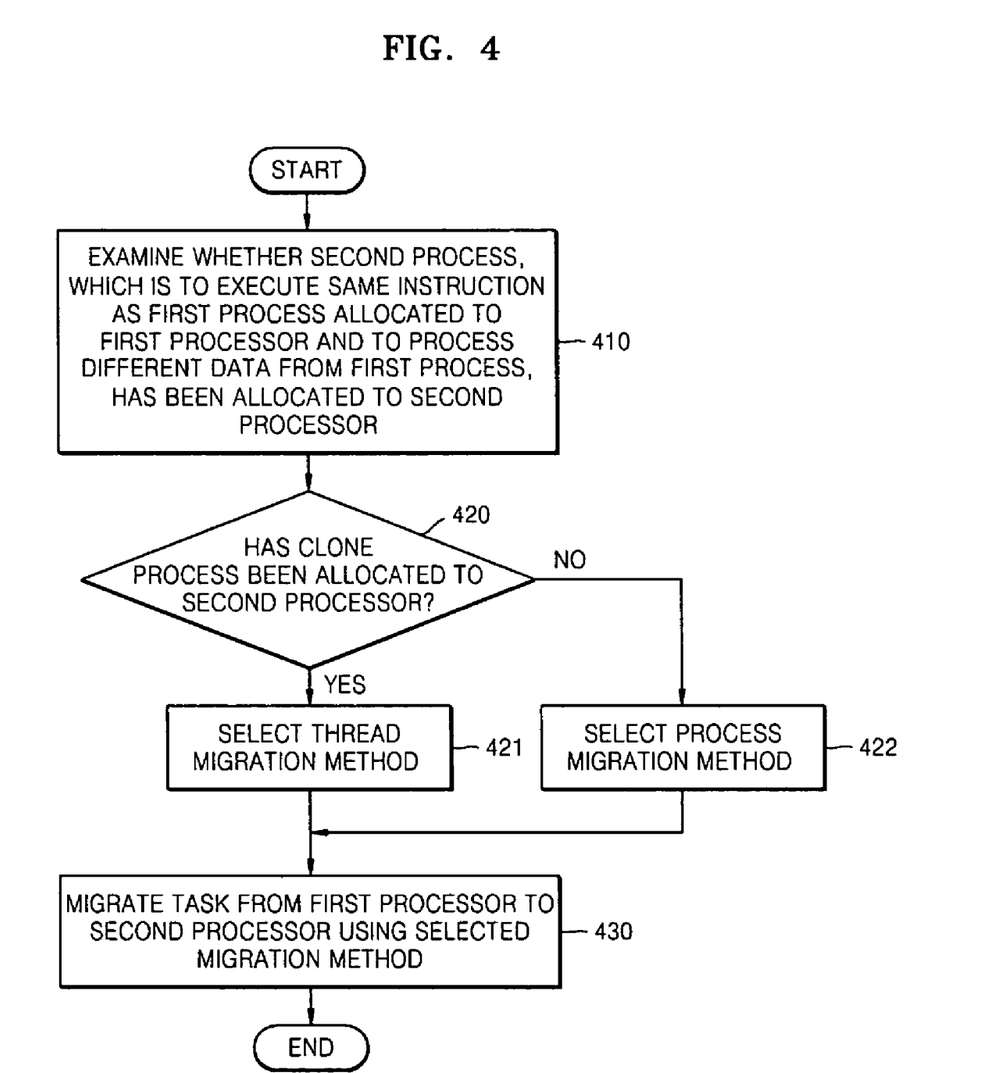
FIG. 4 is a flowchart illustrating a method of migrating a task in a multi-processor system according to an embodiment of the present invention.

FIG. 4 is a flowchart illustrating a method of migrating a task in a multi-processor system according to an embodiment of the present invention.

Referring to FIG. 4, in operation 410, it is examined whether a second process (that is, a clone process), which is to execute the same instruction as a first process allocated to a first processor (that is, a source processor) and to process different data from the first process, has been allocated to a second processor (that is, a target processor). Here, it is assumed that an operation of selecting a source processor and a target processor should precede operation S410.

In operation 420, a method of migrating the first process or a method of migrating a thread included in the first process is selected based on the examination result in operation 410. That is, if the second (clone) process has been allocated to the second processor, the method of migrating the thread included in the first process is selected. If the second (clone) process has not been allocated to the second processor, the method of migrating the first process is selected.

In operation 430, a task is migrated from the first processor to the second processor using a migration method selected in operation 420.

Figure 5:
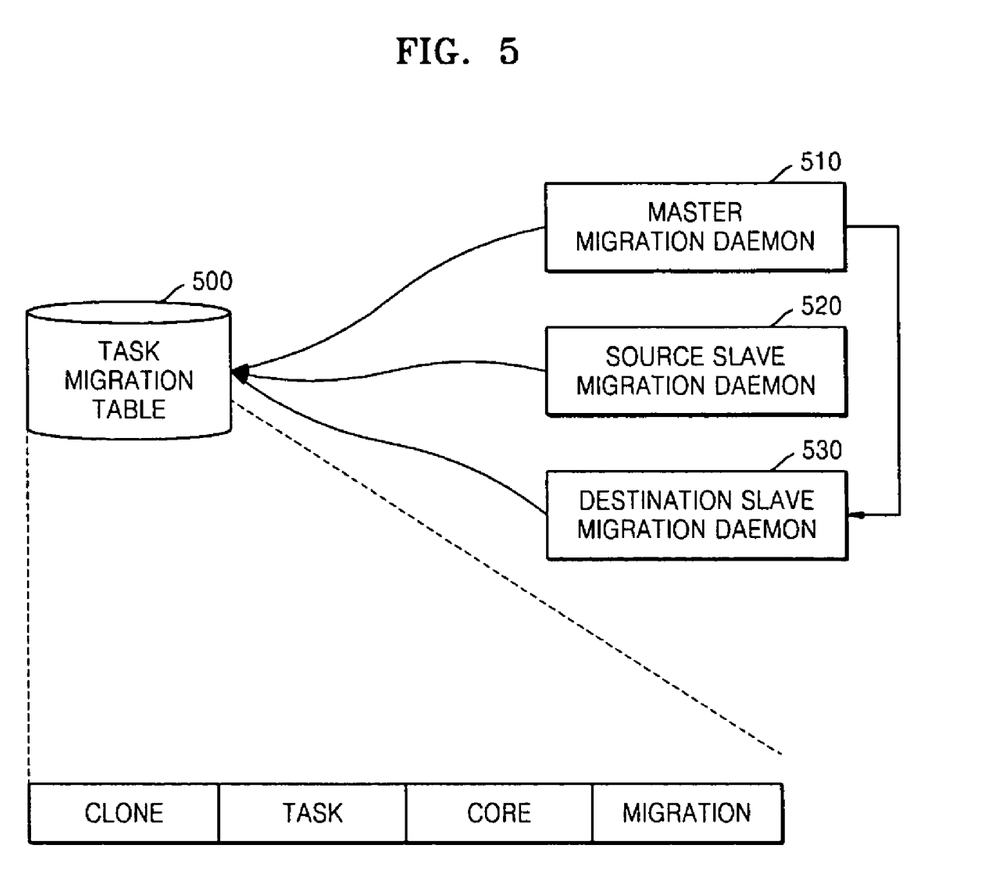
FIG. 5 illustrates a method of migrating a task in a multi-processor system by using a task migration table according to another embodiment of the present invention.

FIG. 5 illustrates a method of migrating a task in a multi-processor system by using a task migration table 500 according to an embodiment of the present invention. In FIG. 5, the structure of the task migration table 330 described above with reference to FIG. 3 and a method of using the task migration table 330 are suggested.

The task migration table 500 may include the following information about each process to be migrated in the multi-processor system. The information may be flexibly configured according to an implementation environment without departing from the technical spirit of embodiments of the present invention.

First, the task migration table 500 includes clone process information. The clone process information may contain information regarding whether a clone process exists and which process is the clone process. Each piece of information contained in the clone process information may be implemented as a simple bit flag or a corresponding process identifier. Second, the task migration table 500 includes task information which contains information regarding each process and threads included in the process. Third, the task migration table 500 includes core information indicating to which processors processes are to be or have been allocated. Fourth, the task migration table 500 includes information regarding from which source processor processes are migrated to a target processor. In reality, the processes are not directly migrated from the source processor to the target processor. Instead, the processes are enqueued to a task queue which allocates tasks to processes.

Three daemons, which are memory-resident programs and manage task migration, are illustrated in FIG. 5. The role of each daemon and a task migration procedure will now be described. A master migration daemon 510 is a top administrator which manages task migration of the entire multi-processor system. While monitoring the task migration table 500, the master migration daemon 510 processes a task migration request. If the multi-processor system has load imbalance or if the total power consumption of the multi-processor system is dominated by a specified processor, the master migration daemon 510 selects a task to migrate. That is, the master migration daemon 510 selects a source processor, to which a task is currently allocated, and a target process to which the task is to be migrated. From the perspective of processor selection, the master migration daemon 510 may correspond to the processor selecting unit 321 described above with reference to FIG. 3.

The master migration daemon 510 indicates the start of migration by setting the migration bit of the selected task. In this case, setting the migration bit denotes setting migration information of a process, which is stored in the task migration table 500, to a certain bit by using the master migration daemon 510.

A source slave migration daemon 520 manages task migration of each processor. The source slave migration daemon 520 detects a task to be migrated based on a migration bit, which is set by the master migration daemon 510 and stored in the task migration table 500, and clears the set migration bit to indicate that the task is ready to be migrated.

The master migration daemon 510 detects the clearing of the migration bit and examines whether a clone process corresponding to a process, which is to be migrated, exists by referring to the task migration table 500. Based on the examination result, the master migration daemon 510 selects the process migration method or the thread migration method as described above in FIG. 4. The master migration daemon 510 transmits a message, which contains information regarding the selected migration method and the object (process or thread) to be migrated, to a destination slave migration daemon 530.

The destination slave migration daemon 530 performs task migration based on the message received from the master migration daemon 510. After finishing the task migration, the destination slave migration daemon 530 updates information regarding the process, which the process itself or the thread has been migrated, in the task migration table 500. That is, if a clone process is terminated by thread migration, clone process information is deleted, a change in the thread information included in the process is recorded, the allocated processor is updated, and migration information is deleted.

The method of migrating a task using the task migration table 500 in the multi-processor system has been described above. According to an embodiment, it can be easily determined whether a clone process corresponding to a process to be migrated exists based on process information recorded in a task migration table, and task migration can be efficiently managed using daemons which are memory-resident programs.

Figure 6A:
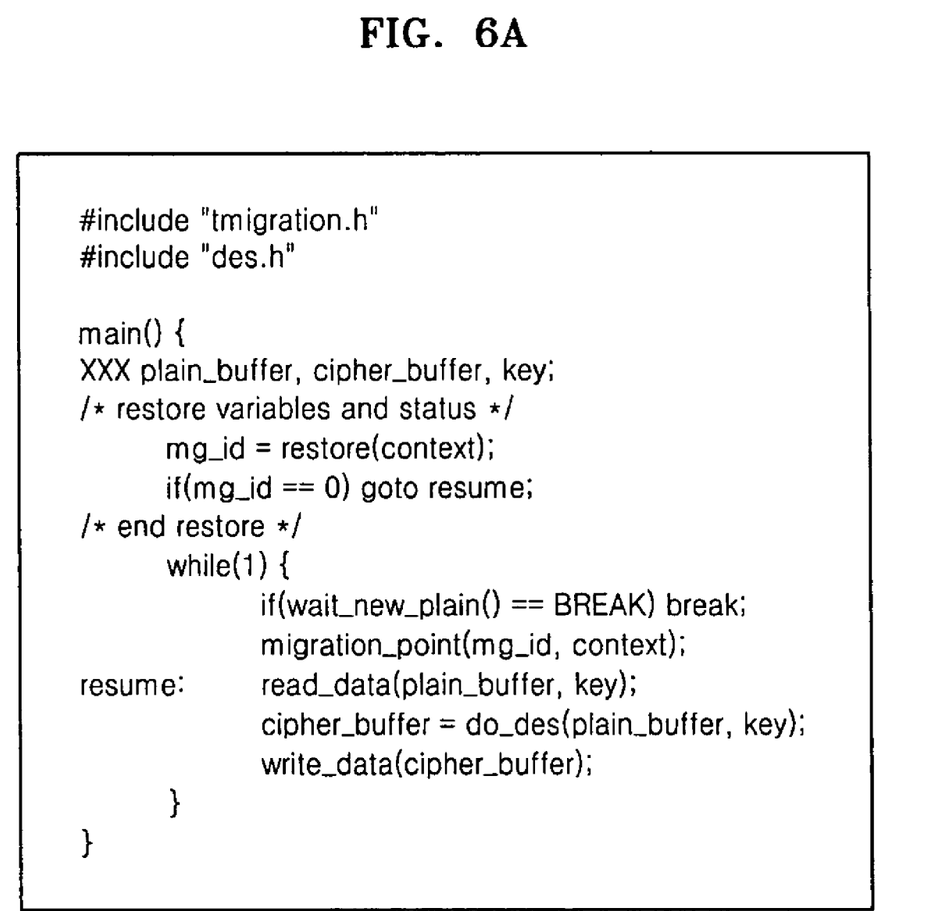
FIGS. 6A and 6B illustrate a program code implemented in a library form to migrate a task in a multi-processor system and a control sequence based on the program code, respectively, according to an embodiment of the present invention.
Figure 6B:
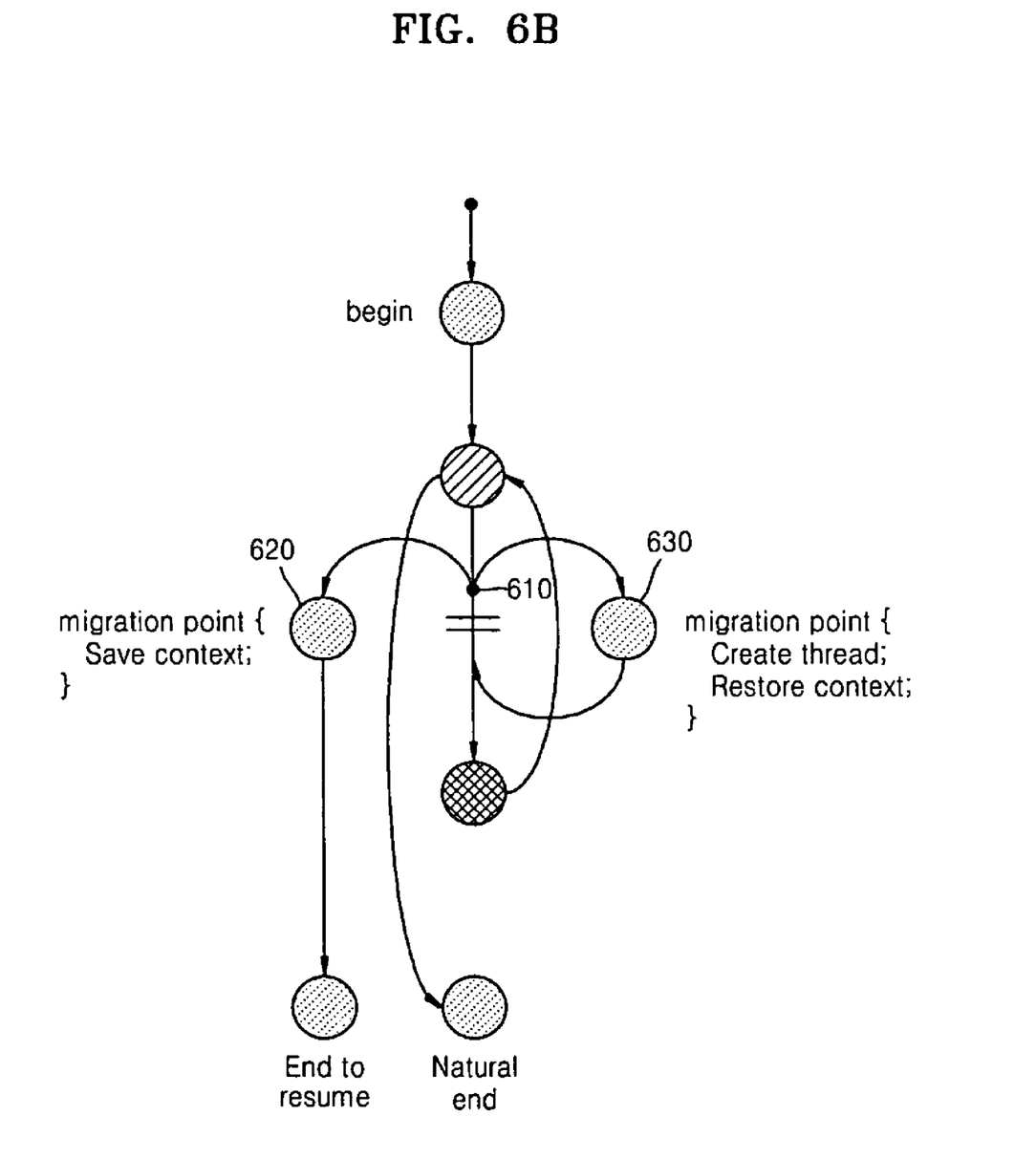

FIGS. 6A and 6B illustrate program code implemented in a library form to migrate a task in a multi-processor system and a control sequence based on the program code, respectively, according to an embodiment of the present invention. The program code is provided within the context of a programming task, such as data encryption, for example.

Accordingly, in FIG. 6A, a main( ) function is an example of a data encryption standard (DES) algorithm which is a type of symmetric key cryptography algorithm. A context is restored, and then mg_id is examined. When a value of mg_id is zero, a character string is input to plain_buffer as source data to be encrypted. Then, the character string is encrypted using a key, and the encrypted character string is recorded in cipher_buffer and output the result. In the program code illustrated in FIG. 6A, restore( ) is a function that restores a context, migration_point( ) indicates is a function that checks whether a task has been migrated and stores or restores a context. In addition, read_data( ) is a function that receives a character string and a key, do_des( ) is a function that performs DES encryption, and write_data( ) is a function that records encryption results.

In FIG. 6A, whenever a program arrives at migration_point( ), it examines whether the migration bit is set. If the migration bit is set, the program saves a current context and terminates its operation. Then, if a target processor (a destination processor to which a task is to be migrated) selects the process migration method, the program implemented in FIG. 6A generates another process identical to the process, which is allocated to a source processor. The generated process is performed from the main( ) function, and a previously executed context is restored at the restore( ) function. In addition, the program, which was previously stopped, is executed again after the migration_point( ) function. In FIG. 6B, reference numeral 610 indicates migration_point( ). If the examination result at migration_point( ) 610 indicates that the migration bit is set, the program saves the current context at a migration point 620 and terminates its operation.

Referring back to FIG. 6A, if the target processor selects the thread migration method, when a process (that is, a clone process), in which a new thread is to be generated, arrives at migration_point( ), a new thread is generated if the migration bit is set, so that an existing process and the new thread can be executed together. Referring to FIG. 6B, if the target processor selects the thread migration method, a thread is generated, and a context is restored at a migration point 630. Then, the program continues to be executed back at migration_point( ) 610.

The program code implemented in the library form to migrate a task in the multi-processor system according to an embodiment has been described above. However, it will be easily deduced by those of ordinary skill in the art to which embodiments of the present invention pertains that the principle of the embodiments described above can be implemented as a module of a kernel of an operating system other than the program code implemented in the library form as illustrated in FIG. 6A or that the function of a task migration table can be implemented as hardware.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing of the computer readable code.

The computer readable code can be recorded on a medium in a variety of ways, with examples of the medium including recording media, such as magnetic storage media (e.g., ROM, floppy disks, hard disks, etc.) and optical recording media (e.g., CD-ROMs, or DVDs). The media may also be a distributed network, so that the computer readable code is stored and executed in a distributed fashion. Still further, as only an example, the processing element could include a processor or a computer processor, and processing elements may be distributed and/or included in a single device.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of migrating a task, which is allocated to a first processor from among a plurality of processors included in a multi-processor system, from the first processor to a second processor, the method comprising:
   examining whether a second process has been allocated to the second processor, the second process having a same instruction to execute as a first process and having different data to process in response to the instruction from the first process, the instruction being to execute the task;
   selecting a method of migrating the first process or a method of migrating a thread included in the first process based on the examining; and
   migrating the task from the first processor to the second processor using the selected method.

2. The method of claim 1, wherein the selecting of the method of migrating the first process or the method of migrating the thread included in the first process comprises:
   selecting the method of migrating the thread included in the first process if the second process has been allocated to the second processor; and
   selecting the method of migrating the first process if the second process has not been allocated to the second processor.

3. The method of claim 1, further comprising generating clone process information indicating whether one process has a same instruction to execute as one of the other previously generated processes, and has different data to process in response to the instruction from the other previously generated processes, wherein the examining of whether the second process has been allocated to the second processor comprises:
   searching processes of the multi-processor system for the second process, which has the same instruction to execute as the first process and has different data to process in response to the instruction from the first process, based on generated clone process information; and
   determining whether the second process, found in the searching, has been allocated to the second processor.

4. The method of claim 3, wherein, the generating of the clone process information comprises extracting information regarding an allocation of each process to a processor from parallelization information which is generated at compile time.

5. The method of claim 3, wherein, the generating of the clone process information comprises tracking generation information of each process in real time.

6. The method of claim 3, further comprising storing the clone process information of each process to be migrated, and information regarding threads included in each process to be migrated.

7. The method of claim 1, further comprising selecting between the first processor and the second processor, the second processor generating less loads or consuming less power than the first processor, based on the load or power consumption of each of the processors.

8. A non-transitory computer-readable recording medium on which a program for executing the method of claim 1 in a computer is recorded.

9. An apparatus for migrating a task, which is allocated to a first processor from among a plurality of processors included in a multi-processor system, from the first processor to a second processor, the apparatus comprising:
   an examining unit to examine whether a second process has been allocated to the second processor, the second process having a same instruction to execute as a first process and having different data to process in response to the instruction from the first process, the instruction being to execute the task;
   a migration method selecting unit to select a method of migrating the first process or a method of migrating a thread included in the first process based on the examination result; and
   a task migrating unit to migrate the task from the first processor to the second processor using the selected method.

10. The apparatus of claim 9, wherein the migration method selecting unit selects the method of migrating the thread included in the first process if the second process has been allocated to the second processor and selects the method of migrating the first process if the second process has not been allocated to the second processor.

11. The apparatus of claim 9, further comprising a clone process information generating unit to indicate whether one process has a same instruction to execute as one of the other previously generated processes, and has different data to process in response to the instruction from the other previously generated processes, wherein the examining unit searches processes of the multi-processor system for the second process, which has the same instruction to execute as the first process and has different data to process in response to the instruction from the first process, based on generated clone process information and determines whether the second process, found in the searching, has been allocated to the second processor.

12. The apparatus of claim 11, wherein the clone process information generating unit generates the clone process information by extracting information regarding an allocation of each process to a processor from parallelization information which is generated at compile time.

13. The apparatus of claim 11, wherein the clone process information generating unit generates the clone process information by tracking generation information of each process in real time.

14. The apparatus of claim 11, further comprising a task migration table to store the clone process information of each process to be migrated, and information regarding threads included in each process to be migrated.

15. The apparatus of claim 9, further comprising a processor selecting unit to select between the first processor and the second processor, the second processor generating less loads or consuming less power than the first processor, based on the load or power consumption of each of the processors.

* * * * *